US012649482B2

(12) United States Patent
Miyake et al.

(10) Patent No.: US 12,649,482 B2
(45) Date of Patent: Jun. 9, 2026

(54) MOTION MANAGER FOR VEHICLE

(71) Applicants: TOYOTA JIDOSHA KABUSHIKI KAISHA, Toyota (JP); J-QUAD DYNAMICS INC., Tokyo (JP); ADVICS CO., LTD., Kariya (JP)

(72) Inventors: Kazuki Miyake, Okazaki (JP); Tatsuya Hiromura, Tokyo (JP)

(73) Assignees: TOYOTA JIDOSHA KABUSHIKI KAISHA, Toyota (JP); J-QUAD DYNAMICS INC., Tokyo (JP); ADVICS CO., LTD., Kariya (JP)

( * ) Notice: Subject to any disclaimer, the term of this patent is extended or adjusted under 35 U.S.C. 154(b) by 28 days.

(21) Appl. No.: 18/758,543

(22) Filed: Jun. 28, 2024

(65) Prior Publication Data

US 2025/0010872 A1     Jan. 9, 2025

(30) Foreign Application Priority Data

Jul. 7, 2023     (JP) ................................. 2023-112112

(51) Int. Cl.
| | |
|---|---|
| *B60W 50/10* | (2012.01) |
| *B60W 10/20* | (2006.01) |
| *B60W 30/14* | (2006.01) |

(52) U.S. Cl.
CPC ............ *B60W 50/10* (2013.01); *B60W 10/20* (2013.01); *B60W 30/143* (2013.01); *B60W 2520/06* (2013.01); *B60W 2520/105* (2013.01); *B60W 2720/106* (2013.01)

(58) Field of Classification Search
CPC .... B60W 50/10; B60W 10/20; B60W 30/143; B60W 2520/06; B60W 2520/105; B60W 2720/106; B60W 50/08; B60W 30/18
USPC .......................................................... 701/41
See application file for complete search history.

(56) References Cited

U.S. PATENT DOCUMENTS

| | | | |
|---|---|---|---|
| 2020/0070849 A1 | 3/2020 | Suzuki et al. | |
| 2021/0331663 A1* | 10/2021 | Newton | G06N 3/08 |
| 2023/0150502 A1* | 5/2023 | Dickson | B60W 50/14 |
| | | | 701/95 |

FOREIGN PATENT DOCUMENTS

JP          2020-032894 A        3/2020

* cited by examiner

*Primary Examiner* — Yi-Kai Wang
(74) *Attorney, Agent, or Firm* — Oliff PLC

(57)          ABSTRACT
A motion manager for a vehicle, includes one or more processors configured to: receive motion requests from a plurality of applications, one or more of the applications being travel applications for controlling at least one of an acceleration of the vehicle or a steering angle of the vehicle, and another one or more of the applications being human-machine interface (HMI) applications for implementing transfer of information from the vehicle to an occupant; perform arbitration of the motion requests that have been received; when the motion requests have been received from the HMI applications, calculate the instruction information based on a different type arbitration result obtained by arbitrating the motion requests from the HMI applications and the result of the arbitration of the motion requests from the travel applications; and output the calculated instruction information to a control device for the actuator.

6 Claims, 3 Drawing Sheets

MOTION MANAGER FOR VEHICLE

CROSS-REFERENCE TO RELATED APPLICATION

This application claims priority to Japanese Patent Application No. 2023-112112 filed on Jul. 7, 2023, incorporated herein by reference in its entirety.

BACKGROUND

1. Technical Field

The present disclosure relates to a motion manager for a vehicle.

2. Description of Related Art

Japanese Unexamined Patent Application Publication No. 2020-032894 (JP 2020-032894 A) discloses a vehicle control system that includes a plurality of execution units, a motion manager, and actuators. The execution units execute individual applications. The motion manager receives motion requests from a plurality of applications. The motion manager arbitrates the motion requests. That is, the motion manager selects one of the motion requests according to a rule determined in advance. The motion manager generates instruction information for the actuators based on the motion request that has won in the arbitration (the selected motion request).

SUMMARY

Techniques such as that according to JP 2020-032894 A occasionally adopts an arbitration method in which the most significant one of a plurality of motion requests, such as requests to brake the vehicle, for example, is selected. The motion requests from the applications include those intended for travel of the vehicle and those intended to call attention of an occupant. The significance of the motion requests for calling attention of an occupant is occasionally considerably less than the significance of the motion requests intended for travel of the vehicle. Therefore, if arbitration is performed by the arbitration method discussed above when there are two types of motion requests at the same time, motion requests for calling attention of an occupant may be buried in motion requests for travel of the vehicle, and the motion requests for calling attention of an occupant may not be reflected.

A motion manager according to a first aspect of the present disclosure is for a vehicle. The motion manager includes one or more processors configured to: receive motion requests from a plurality of applications, one or more of the applications being travel applications for controlling at least one of an acceleration of the vehicle or a steering angle of the vehicle, and another one or more of the applications being human-machine interface (HMI) applications for implementing transfer of information from the vehicle to an occupant; perform arbitration of the motion requests that have been received; when the motion requests have not been received from the HMI applications, calculate instruction information for an actuator of the vehicle based on a result of the arbitration of the motion requests from the travel applications; when the motion requests have been received from the HMI applications, calculate the instruction information based on a different type arbitration result obtained by arbitrating the motion requests from the HMI applications and the result of the arbitration of the motion requests from the travel applications; and output the calculated instruction information to a control device for the actuator.

With the above configuration, when there are different types of motion requests, the different types of movement requests can be reflected in the control of a vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
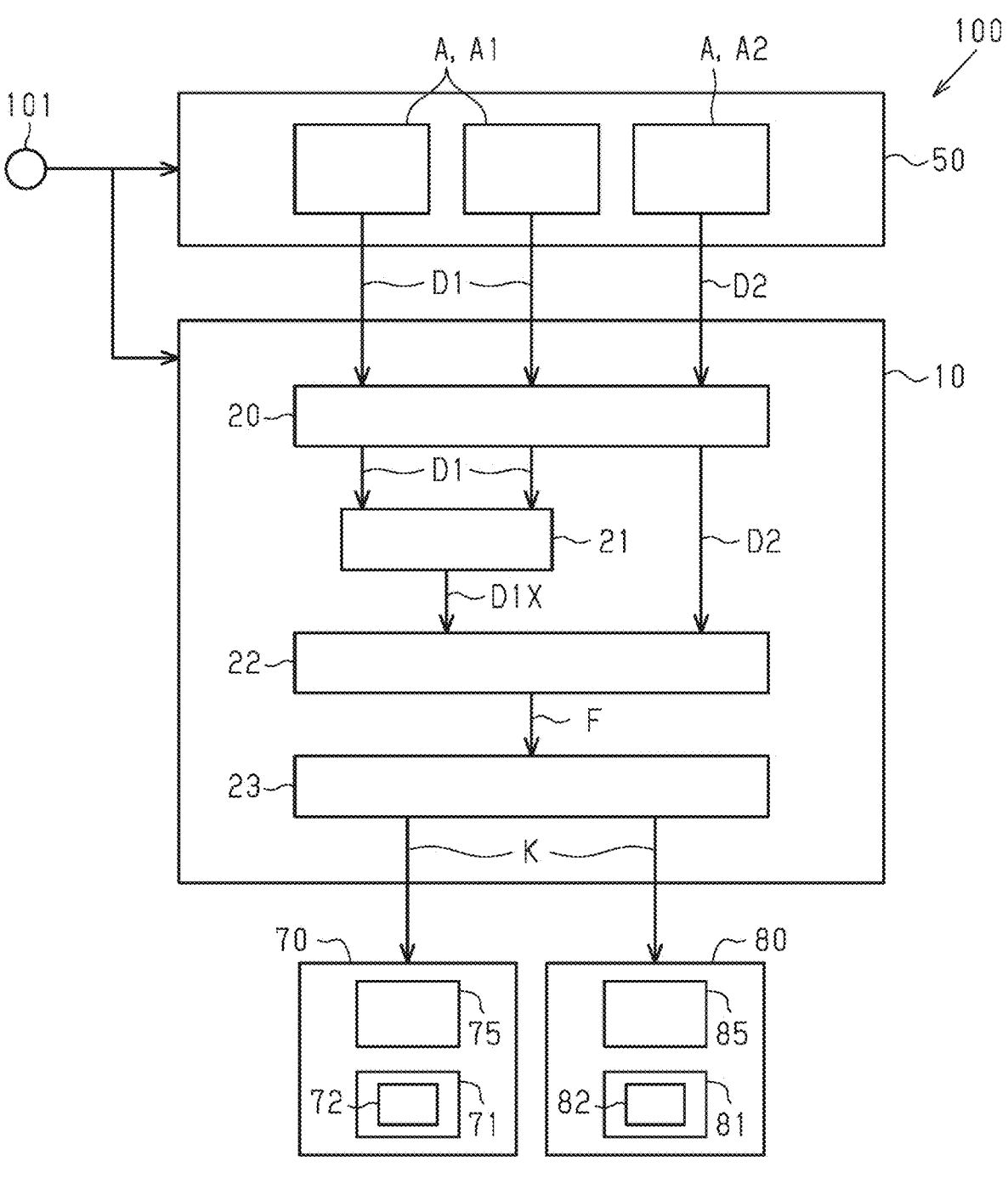
FIG. 1 illustrates a schematic configuration of a vehicle.

A motion manager for a vehicle according to an embodiment will be described below with reference to the drawings.
Overall Configuration of Vehicle As illustrated in FIG. 1, a vehicle 100 includes an instruction electronic control unit (ECU) 50, a management ECU 10, a first actuator system 70, and a second actuator system 80.

The first actuator system 70 includes an engine 71 and an engine ECU 75. The engine 71 is a drive source for the vehicle 100. The engine 71 includes a plurality of actuators 72 such as a throttle valve, a fuel injection valve, and an ignition device. In FIG. 1, one of the actuators 72 is illustrated as a representative. The engine ECU 75 is a computer that includes a processing circuit. The processing circuit includes a central processing unit (CPU) and a memory. The memory stores in advance various programs that describe processes to be executed by the CPU. The engine ECU 75 controls the actuators 72 of the engine 71 based on instruction information K from the management ECU 10. That is, the engine ECU 75 is a control device that controls the actuators 72. Fuel is combusted in the engine 71 when the engine ECU 75 controls the actuators 72. At the same time, a drive force is generated in the vehicle 100.

The second actuator system 80 includes a plurality of brake devices 81 and a brake ECU 85. In FIG. 1, one of the brake devices 81 is illustrated as a representative. The brake device 81 is provided for each of wheels of the vehicle 100. The brake device 81 includes a disc that rotates together with the wheel, brake pads that operate according to a hydraulic pressure, and an actuator 82 that applies the hydraulic pressure to the brake pads. The brake ECU 85 is a computer that includes a processing circuit. The processing circuit includes a central processing unit (CPU) and a memory. The memory stores in advance various programs that describe processes to be executed by the CPU. The brake ECU 85 controls the actuators 82 based on instruction information K from the management ECU 10. That is, the brake ECU 85 is a control device that controls the actuators 82. When a hydraulic pressure is generated by the brake ECU 85 controlling the actuator 82, the brake pads are pressed against the disc. At the same time, a braking force is generated in the vehicle 100.

Although not illustrated, the vehicle 100 includes actuator systems other than the first actuator system 70 and the second actuator system 80. Examples of the other actuator systems include a steering system that adjusts the steering angle of the vehicle 100. The steering system includes an actuator that adjusts the steering angle and an ECU as a control device for the actuator. The steering angle includes both a steering operation angle of a steering wheel and steered angles of wheels to be steered. The wheels to be steered may be front wheels, for example.

Instruction ECU

The instruction ECU 50 is a computer that includes a processing circuit. The processing circuit includes a central processing unit (CPU) and a memory. The memory stores in advance various programs that describe processes to be executed by the CPU. Examples of the programs stored in the memory include a plurality of applications A for controlling motion of the vehicle 100. The instruction ECU 50 functions as an execution device that executes the applications A stored in the instruction ECU 50 itself. The instruction ECU 50 occasionally executes a plurality of applications A concurrently. The instruction ECU 50 sequentially acquires information detected by various sensors 101 mounted on the vehicle 100. The instruction ECU 50 references the information acquired from the various sensors 101 when executing the applications A. The various sensors 101 include devices that detect peripheral information on the vehicle 100 such as a camera and a radar, for example. The various sensors 101 include devices that detect the travel state of the vehicle 100 such as the travel speed of the vehicle 100, for example. In FIG. 1, one of the various sensors 101 is illustrated as a representative.

In the following description, a content in which the instruction ECU 50 actually acts as a subject is occasionally described as a content in which the application A being executed acts as a subject. For example, the instruction ECU 50 outputting a motion request may be described as the application A outputting a motion request, and a motion request from the instruction ECU 50 may be described as a motion request from the application A. In relation to the present embodiment, an application A related to the control of an acceleration C of the vehicle 100 is described, among the applications A stored in the instruction ECU 50. The acceleration C of the vehicle 100 is positive when the vehicle 100 accelerates forward, and is negative when the vehicle 100 accelerates rearward.

The applications A stored in the instruction ECU 50 can be roughly classified into two types, namely travel applications A1 and human-machine interface (HMI) applications A2. The travel applications A1 are applications A for controlling the acceleration C for travel of the vehicle 100. Motion requests from the travel applications A1 are each a request for the acceleration C to be achieved by the vehicle 100. The travel applications A1 output a requested acceleration D1 as information that embodies the motion requests. The instruction ECU 50 repeatedly outputs the requested acceleration D1 in predetermined control cycles when the travel applications A1 are executed. When outputting the requested acceleration D1, the instruction ECU 50 adds a first identification value to the requested acceleration D1. The first identification value is a data identification value indicating that the content of the motion request is the requested acceleration D1.

The HMI applications A2 are applications A for implementing the transfer of information from the vehicle 100 to an occupant. Specifically, the HMI applications A2 cause the vehicle 100 to operate to call attention of the occupant. Motion requests from the HMI applications A2 are each a request to intermittently decelerate the vehicle 100 within a control period T when seen chronologically. The HMI applications A2 output an HMI acceleration D2 indicated in FIG. 2B as information that embodies the motion requests. The HMI acceleration D2 according to the present embodiment is applicable to the case where the vehicle 100 is traveling forward. In the HMI acceleration D2, the acceleration C alternates between zero and a specified acceleration D2A as the time elapses. The specified acceleration D2A has a negative value. The specified acceleration D2A has been determined in advance through experiments or simulations as a value that is suitable for calling attention of an occupant. In the example in FIG. 2B, the HMI acceleration D2 is varied such that the vehicle is decelerated twice within the control period T. In the example in FIG. 2B, in addition, the time width for which the specified acceleration D2A is continued and the time width for which the zero acceleration C is continued are set to be equal to each other. The control period T has been determined in advance as a length of time that is suitable for continuously calling attention of an occupant. The control period T may be one second, for example. The control period T is longer than one cycle of the predetermined control cycle described above. When the HMI applications A2 are executed, the instruction ECU 50 repeatedly outputs the HMI acceleration D2 during the control period T each time a predetermined condition for calling attention of an occupant is met. The instruction ECU 50 outputs the HMI acceleration D2 in the same control cycles as the travel applications A1. When outputting the HMI acceleration D2, the instruction ECU 50 adds a second identification value to the HMI acceleration D2. The second identification value is a data identification value indicating that the content of the motion request is the HMI acceleration D2. The second identification value has been determined in advance as a value that is different from the first identification value.

As illustrated in FIG. 1, the memory of the instruction ECU 50 according to the present embodiment stores only one HMI application A2. Meanwhile, the memory of the instruction ECU 50 stores a plurality of different travel applications A1. In FIG. 1, two of the travel applications A1 are illustrated as representatives.

Management ECU

Figure 3:
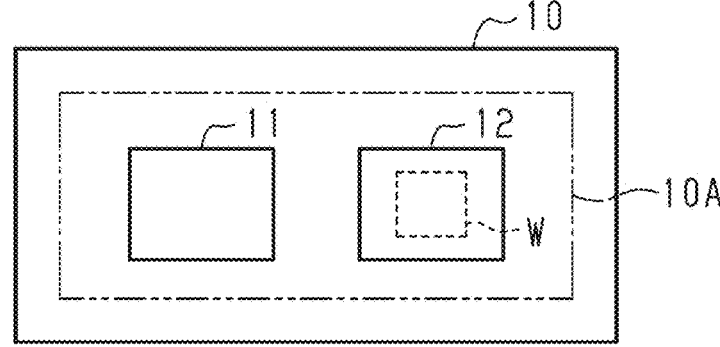
FIG. 3 illustrates a schematic configuration of a management electronic control unit (ECU)

As illustrated in FIG. 3, the management ECU 10 is a computer that includes a processing circuit 10A. The processing circuit 10A includes a CPU 11 and a memory 12. The memory 12 stores in advance various programs W that describe processes to be executed by the CPU 11. The management ECU 10 functions as a motion manager for the vehicle 100 when the CPU 11 of the management ECU 10 executes the programs W stored in the memory 12. The motion manager performs the function of managing the motion of the vehicle 100 requested by the applications A. The management ECU 10 can exchange information with the instruction ECU 50 and the ECUs of the actuator systems via an internal bus (not illustrated). The management ECU 10 also sequentially acquires information from the various sensors 101.

The function of the management ECU 10 as the motion manager will be described below for the acceleration C of the vehicle 100. The management ECU 10 can execute a management process. The management process is a process for comprehensively managing the acceleration C of the vehicle 100. As illustrated in FIG. 1, the management ECU 10 functions as a reception unit 20, a first arbitration unit 21, a second arbitration unit 22, and an output unit 23 when executing the management process.

The management ECU 10 repeatedly executes the management process in the above predetermined control cycles. When no motion requests are received from any of the applications A, the management ECU 10 ends one cycle of the management process without executing the processes in steps to be discussed later. In this case, control for the actuators 72, 82 based on motion requests from the applications A is not executed.

Figure 4:
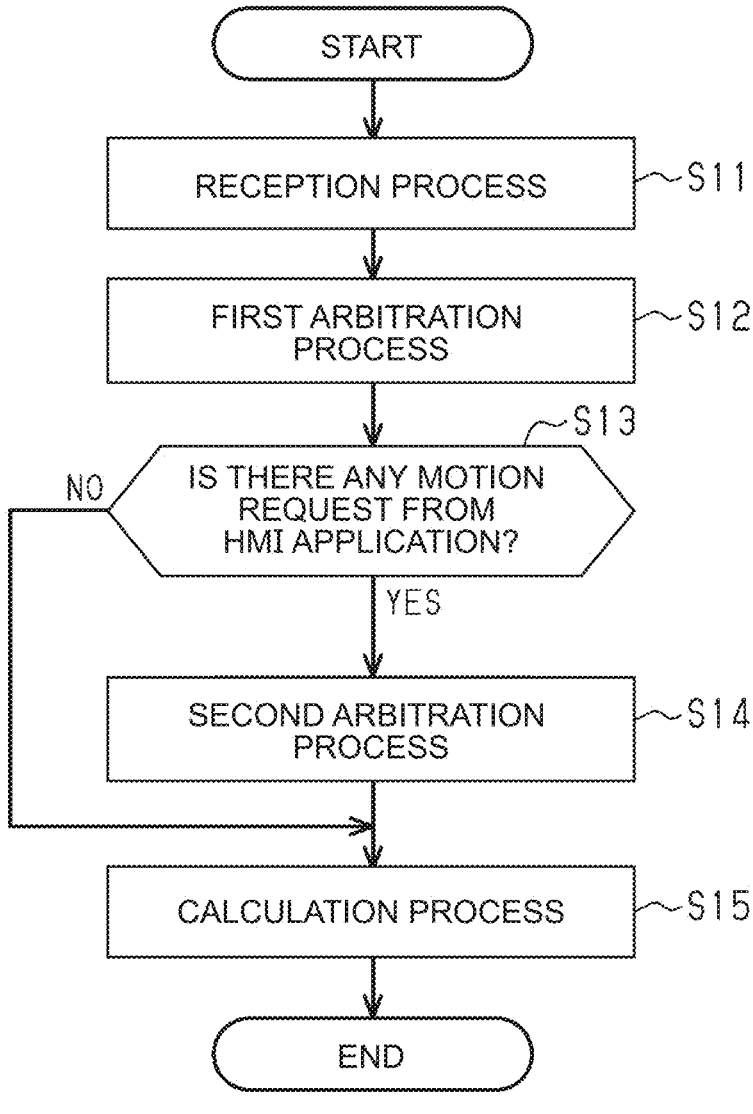
FIG. 4 is a flowchart illustrating a process procedure of a management process.

In the management process, as illustrated in FIG. 4, the management ECU 10 first performs the process in step S11. In step S11, the reception unit 20 performs a reception process. In the reception process, as illustrated in FIG. 1, the reception unit 20 receives motion requests from the applications A. That is, the reception unit 20 receives requested accelerations D1 from the travel applications A1. Meanwhile, the reception unit 20 receives an HMI acceleration D2 from the HMI application A2. When motion requests are received from the applications A, the reception unit 20 grasps the content of the motion requests based on data identification values attached to the motion requests. The memory 12 of the management ECU 10 stores in advance data identification values and the content of motion requests indicated by the data identification values in correlation with each other. When the content of the motion requests is grasped, the reception unit 20 outputs the motion requests to one of the first arbitration unit 21 and the second arbitration unit 22 according to the content. The reception unit 20 outputs the requested accelerations D1 as motion requests from the travel applications A1 to the first arbitration unit 21. On the other hand, the reception unit 20 outputs the HMI acceleration D2 as a motion request from the HMI application A2 to the second arbitration unit 22. The reception unit 20 may perform the process in step S11 in a situation in which there are motion requests from the travel applications A1 and there is no motion request from the HMI application A2. In this case, the reception unit 20 receives only the motion requests from the travel applications A1 in step S11. The reception unit 20 outputs all the motion requests that have been received to the first arbitration unit 21. As illustrated in FIG. 4, the management ECU 10 advances the process to step S12 when the process in step S11 is finished.

In step S12, the first arbitration unit 21 performs a first arbitration process. As illustrated in FIG. 1, the first arbitration unit 21 arbitrates the requested accelerations D1 output from the reception unit 20, that is, the requested accelerations D1 received by the reception unit 20 in step S11. The first arbitration unit 21 selects a requested acceleration D1 with the smallest value, among the requested accelerations D1 received by the reception unit 20. The first arbitration unit 21 calculates a selected acceleration D1X as the selected requested acceleration D1 as a basic arbitration result. After that, the first arbitration unit 21 outputs the selected acceleration D1X to the second arbitration unit 22. After that, as illustrated in FIG. 4, the management ECU 10 advances the process to step S13.

In step S13, the second arbitration unit 22 performs a determination process. Specifically, the second arbitration unit 22 determines whether an HMI acceleration D2 has been acquired from the reception unit 20, that is, whether the reception unit 20 has received an HMI acceleration D2 from the HMI application A2 in step S11. When an HMI acceleration D2 has not been acquired from the reception unit 20

(step S13: NO), the second arbitration unit 22 performs the following. That is, the second arbitration unit 22 outputs the selected acceleration D1X acquired from the first arbitration unit 21 through the process in step S12 to the output unit 23 as a final arbitration result F. At the same time, the management ECU 10 skips the process in step S14 to be described later, and advances the process to step S15.

Figure 2A:
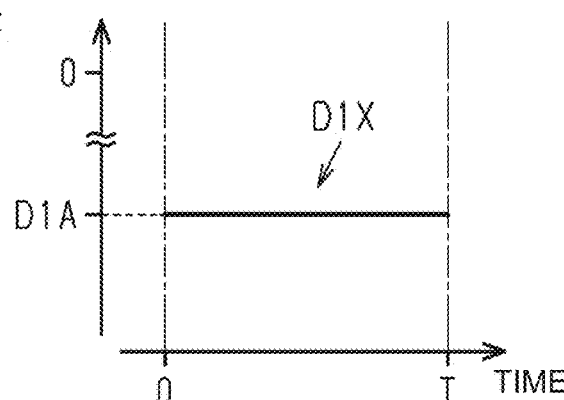
FIG. 2A illustrates an example of transitions of a selected acceleration.
Figure 2B:
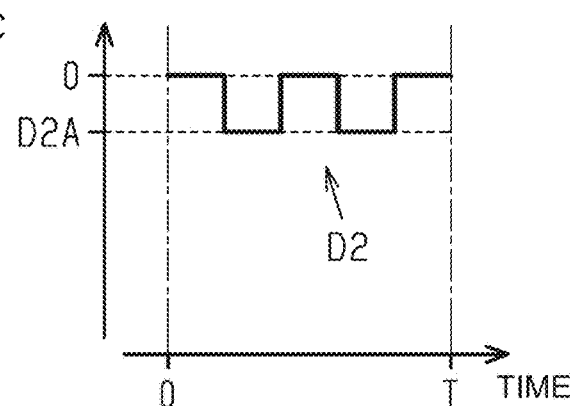
FIG. 2B illustrates an example of transitions of a human-machine interface (HMI) acceleration.
Figure 2C:
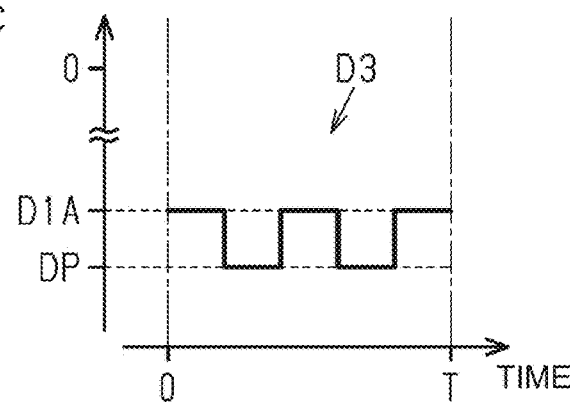
FIG. 2C illustrates an example of transitions of an arbitration acceleration.

In step S13, when an HMI acceleration D2 has been acquired from the reception unit 20, that is, when the reception unit 20 has received an HMI acceleration D2 from the HMI application A2 in step S11 (step S13: YES), on the other hand, the second arbitration unit 22 advances the process to step S14. In this case, the second arbitration unit 22 performs a second arbitration process in step S14. In the second arbitration process, as illustrated in FIG. 1, the second arbitration unit 22 arbitrates the selected acceleration D1X acquired from the first arbitration unit 21 and the HMI acceleration D2 acquired from the reception unit 20. Specifically, the second arbitration unit 22 superimposes the HMI acceleration D2 on the selected acceleration D1X. A specific mode of this superimposition will be described. In the following description, it is assumed that the selected acceleration D1X is constant at a negative prescribed acceleration D1A over the entire control period T as indicated in FIG. 2A. The second arbitration unit 22 calculates a value obtained by adding the HMI acceleration D2 indicated in FIG. 2B to the selected acceleration D1X indicated in FIG. 2A as an arbitration acceleration D3 as a different type arbitration result. The HMI acceleration D2 has a value of either zero or the specified acceleration D2A. Thus, the arbitration acceleration D3 takes a value of either the prescribed acceleration D1A or a sum value DP obtained by adding the specified acceleration D2A to the prescribed acceleration D1A as indicated in FIG. 2C. When the arbitration acceleration D3 is seen chronologically, the arbitration acceleration D3 is decreased from the prescribed acceleration D1A to the sum value DP twice during the control period T as indicated in FIG. 2C. As illustrated in FIG. 1, when the arbitration acceleration D3 is calculated, the second arbitration unit 22 outputs the arbitration acceleration D3 to the output unit 23 as the final arbitration result F. After that, as illustrated in FIG. 4, the management ECU 10 advances the process to step S15.

In step S15, the output unit 23 performs a calculation process. In the calculation process, as illustrated in FIG. 1, the output unit 23 calculates instruction information K for the actuator 72 of the first actuator system 70 and the actuator 82 of the second actuator system 80 based on the final arbitration result F. When the reception unit 20 has not received an HMI acceleration D2 from the HMI application A2 in step S11, the output unit 23 calculates the instruction information K based on the selected acceleration D1X as the basic arbitration result. When the reception unit 20 has received an HMI acceleration D2 in step S11, on the other hand, the output unit 23 calculates the instruction information K based on the arbitration acceleration D3 as the different type arbitration result.

The output unit 23 calculates the instruction information K as follows. First, the output unit 23 determines the distribution of the final arbitration result F, as an acceleration value, to the first actuator system 70 and the second actuator system 80 based on the magnitude of the final arbitration result F. The output unit 23 converts respective distributed values of the final arbitration result F into values in the unit of force. The output unit 23 calculates the values after the conversion as the instruction information K. When the final arbitration result F has a positive value, the output unit 23 calculates the instruction information K such that the drive force of the vehicle 100 becomes larger as the final arbitration result F is greater. When the final arbitration result F has a negative value, on the other hand, the output unit 23 calculates the instruction information K such that the braking force of the vehicle 100 becomes larger as the first acceleration is lower. In this manner, the output unit 23 calculates the instruction information K that matches the final arbitration result F for each of the actuator systems.

When the instruction information K is calculated as described above, the output unit 23 outputs the calculated instruction information K to the engine ECU 75 and the brake ECU 85. After that, as illustrated in FIG. 4, the management ECU 10 ends the process in step S15. At the same time, the management ECU 10 ends the series of processes of the management process, and executes the processes of the management process again.

Functions of Embodiment

Now, it is assumed that requested accelerations D1 from two travel applications A1 and an HMI acceleration D2 from an HMI application A2 are output as illustrated in FIG. 1. In this case, the management ECU 10 performs arbitration of the three motion requests in two stages. As arbitration in the first stage, the first arbitration unit 21 arbitrates the requested accelerations D1 from the two travel applications A1. That is, the first arbitration unit 21 selects the lower one of the two requested accelerations D1 as the selected acceleration D1X. After that, as arbitration in the second stage, the second arbitration unit 22 calculates an arbitration acceleration D3 by adding the selected acceleration D1X and the HMI acceleration D2 from the HMI application A2. When the entire control period T is seen, the second arbitration unit 22 calculates the arbitration acceleration D3 at each timing by intermittently decreasing the prescribed acceleration D1A as the selected acceleration D1X according to the HMI acceleration D2 at each timing as indicated in FIG. 2C. In response to the calculation of the arbitration acceleration D3, the output unit 23 calculates instruction information K that matches the arbitration acceleration D3. The output unit 23 outputs the calculated instruction information K to the engine ECU 75 and the brake ECU 85. Then, the ECUs 75, 85 control the corresponding actuators 72, 82 according to the instruction information K. As a result, the vehicle 100 achieves transitions in which the selected acceleration D1X is intermittently decreased as indicated in FIG. 2C.

Effects of Embodiment (1) As described above in Functions of Embodiment, the management ECU 10 performs arbitration in two stages when motion requests are received from both the travel applications A1 and the HMI application A2. In the arbitration in the second stage, of the arbitration in the two stages, the management ECU 10 performs arbitration of different types of motion requests using a different rule from that for the arbitration in the first stage in which one of a plurality of motion requests is selected. In the arbitration in the second stage, the management ECU 10 performs arbitration so as to coordinate the different types of motion requests. In this manner, the management ECU 10 can have the motion request from the HMI application A2 reflected in the instruction information K without having the motion request from the HMI application A2 buried in the motion requests from the travel applications A1. That is, in the present embodiment, when there are different types of motion requests, namely motion requests for travel of the vehicle 100 and a motion request for calling attention of an occupant, the two types of motion requests can be reflected in the control of the vehicle 100.

(2) In the arbitration in the second stage, the management ECU 10 adds the selected acceleration D1X and the HMI acceleration D2. By adding the two accelerations C in this manner, the management ECU 10 can reliably have the two accelerations C reflected in the arbitration acceleration D3.

(3) The following is enabled by superimposing the HMI acceleration D2, which intermittently decelerates the vehicle 100, on the requested acceleration D1 for travel of the vehicle 100 as in the present embodiment. That is, the vehicle 100 can be intermittently braked during deceleration of the vehicle 100 as indicated in FIG. 2C, for example.

Modifications

The above embodiment can be modified as follows. The above embodiment and the following modifications can be combined with each other as long as no technical contradiction arises.

The mode of superimposition of the selected acceleration D1X and the HMI acceleration D2 is not limited to the example according to the above embodiment. For example, multiplication may be used instead of addition when superimposing the two accelerations C. When multiplication is used as a mode of superimposition, it is conceivable to convert the HMI acceleration D2 into an appropriate coefficient and multiply the selected acceleration D1X by the coefficient.

The manner of arbitration of the selected acceleration D1X and the HMI acceleration D2 is not limited to one in which superimposition is used. It is only necessary that the manner of arbitration should be one in which both the selected acceleration D1X and the HMI acceleration D2 can be reflected in the different type arbitration result and hence in the instruction information K.

Regarding the motion request from the HMI application A2, the number of times when the vehicle 100 is intermittently decelerated is changeable as appropriate.

The motion request from the HMI application A2 is not limited to a request to intermittently decelerate the vehicle 100. Necessary motion requests may be made so that appropriate information can be transferred from the vehicle 100 to an occupant.

The instruction ECU 50 may store a plurality of HMI applications A2. Also in this case, preliminary processing may be configured such that one motion request is made from an HMI application A2 that participates in the arbitration in the second arbitration process. In the second arbitration process, a different type arbitration result may be calculated by arbitrating a motion request from any of the HMI applications A2 and the basic arbitration result.

The method of arbitration between motion requests from the travel applications A1 is not limited to the example according to the above embodiment. Arbitration rules may be determined so that an appropriate arbitration result can be obtained.

The travel applications A1 are not limited to those which control the acceleration C during travel of the vehicle 100. The travel applications A1 may control the steering angle during travel of the vehicle 100. Similarly, the HMI application A2 may implement the transfer of information from the vehicle 100 to an occupant through variations in the steering angle of the vehicle 100. Also when a parameter handled by motion requests is the steering angle of the vehicle 100, a basic arbitration result may be calculated by arbitrating motion requests from the travel applications A1, and a different type arbitration result may be calculated by arbitrating the basic arbitration result and a motion request from the HMI application A2, as in the above embodiment. Instruction information for the actuators of the steering system may be calculated based on the different type arbitration result. When arbitrating the basic arbitration result and a motion request from the HMI application A2, these may be superimposed on each other, as in the above embodiment. Any arbitration method may be used as long as both the basic arbitration result and a motion request from the HMI application A2 can be reflected in the different type arbitration result and hence in the instruction information. When a parameter handled by motion requests is the steering angle of the vehicle 100, it is conceivable that motion requests from the travel applications A1 are a steering operation angle requested for the steering wheel, for example. It is conceivable that a motion request from the HMI application A2 is a request to swing the steering wheel rightward and leftward during a control period determined in advance when seen chronologically, for example. The steering wheel is controlled by having the two types of motion requests reflected in the instruction information. For example, a steering operation angle for swinging the steering wheel rightward and leftward according to a motion request from the HMI application A2 is added to a requested steering operation angle indicated by motion requests from the travel applications A1, the result of the addition is calculated as a different type arbitration result, and the different type arbitration result is reflected in the instruction information. This allows the steering wheel to be swung rightward and leftward while turning the steering wheel. The steering operation angle can be determined as an angle from the neutral position of the steering wheel at which the vehicle 100 travels straight, for example.

The overall configuration of the vehicle 100 is not limited to the example according to the above embodiment. For example, a motor generator may be used as a drive source for the vehicle 100 in place of or in addition to the engine 71. When a motor generator is mounted on the vehicle 100, a control device that controls the motor generator may be mounted on the vehicle. When these devices are provided on the vehicle, the vehicle is provided with an actuator system that includes a motor generator as an actuator and a control device for the motor generator.

The processing circuit 10A of the management ECU 10 may have any of the following configurations (a) to (c). The same applies to the processing circuits of the other ECUs such as the instruction ECU 50, for example.

(a) The processing circuit 10A includes one or more processors that execute various processes according to a computer program. The processors include a CPU and a memory such as a random access memory (RAM) and a read only memory (ROM). The memory stores program codes or instructions configured to cause the CPU to execute the processes. The memory, that is, a computer-readable medium, includes any available medium that can be accessed by a general-purpose or special-purpose computer.

(b) The processing circuit 10A includes one or more dedicated hardware circuits that execute various processes. Examples of the dedicated hardware circuits include an application specific integrated circuit (ASIC) and a field programmable gate array (FPGA). The ASIC is an abbreviation for "application specific integrated circuit", and the FPGA is an abbreviation for "field programmable gate array".

(c) The processing circuit 10A includes a processor that executes a part of various processes according to a computer program, and a dedicated hardware circuit that executes the rest of the various processes.

What is claimed is:

1. A motion manager for a vehicle, comprising one or more processors configured to:

receive motion requests from a plurality of applications, one or more of the applications being travel applications for controlling at least one of an acceleration of the vehicle or a steering angle of the vehicle, and another one or more of the applications being human-machine interface (HMI) applications for implementing transfer of information from the vehicle to an occupant;

perform first arbitration of the motion requests from the travel applications;

in response to receiving the motion requests from the HMI applications, calculate instruction information for an actuator of a vehicle based on a second arbitration result of a second arbitration in which (i) the motion requests from the HMI applications and (ii) a first arbitration result are arbitrated, wherein the first arbitration result is a result of the first arbitration of the motion requests from the travel applications;

output the calculated instruction information to a control device for the actuator; and control motion of the vehicle with the actuator based on the calculated instruction information.

2. The motion manager for the vehicle according to claim 1, wherein the second arbitration result is calculated by superimposing the motion requests from the HMI applications on the result of the first arbitration of the motion requests from the travel applications.

3. The motion manager for the vehicle according to claim 2, wherein:

the motion requests from the travel applications are each a request for an acceleration to be achieved by the vehicle;

the motion requests from the HMI applications are each a request to intermittently decelerate the vehicle during a control period determined in advance; and the one or more processors are configured to calculate the second arbitration result by intermittently decreasing the acceleration indicated by the motion requests from the travel applications according to the motion requests from the HMI applications.

4. The motion manager for the vehicle according to claim 2, wherein:

the motion requests from the travel applications are each a request for a steering operation angle to be achieved by the vehicle;

the motion requests from the HMI applications are each a request to swing a steering wheel of the vehicle rightward and leftward during a control period determined in advance; and the one or more processors are configured to calculate the second arbitration result by adding a steering operation angle for swinging the steering wheel rightward and leftward according to the motion requests from the HMI applications to the steering operation angle indicated by the motion requests from the travel applications.

5. The motion manager for the vehicle according to claim 1, wherein the first arbitration uses a different rule than that used by the second arbitration.

6. The motion manager for the vehicle according to claim 1, wherein the second arbitration result of the second arbitration adds an acceleration from one of the travel applications to an acceleration from one of the HMI applications.

* * * * *